(12) United States Patent
Tajima et al.

(10) Patent No.: US 11,376,930 B2
(45) Date of Patent: Jul. 5, 2022

(54) CAB FOR CONSTRUCTION MACHINE

(71) Applicant: Caterpillar SARL, Geneva (CH)

(72) Inventors: Hidenobu Tajima, Akashi (JP); Shigeyuki Kikuchi, Kobe (JP)

(73) Assignee: Caterpillar SARL, Geneva (CH)

( * ) Notice: Subject to any disclaimer, the term of this patent is extended or adjusted under 35 U.S.C. 154(b) by 419 days.

(21) Appl. No.: 16/611,802

(22) PCT Filed: May 16, 2018

(86) PCT No.: PCT/EP2018/062812
§ 371 (c)(1),
(2) Date: Nov. 7, 2019

(87) PCT Pub. No.: WO2018/210970
PCT Pub. Date: Nov. 22, 2018

(65) Prior Publication Data
US 2020/0062092 A1 Feb. 27, 2020

(30) Foreign Application Priority Data
May 17, 2017 (JP) .............................. JP2017-098350

(51) Int. Cl.
*B60J 7/00* (2006.01)
*E02F 9/16* (2006.01)
(Continued)

(52) U.S. Cl.
CPC .............. *B60J 7/0015* (2013.01); *E02F 9/16* (2013.01); *B60J 1/00* (2013.01); *B60J 1/2011* (2013.01); *B60Y 2200/412* (2013.01)

(58) Field of Classification Search
CPC ... B60J 7/0015; B60J 1/00; E02F 9/16; B60Y 2200/20; B60Y 2200/40; B60Y 2200/80; B60Y 2200/412; E05C 17/60
(Continued)

(56) References Cited

FOREIGN PATENT DOCUMENTS

| CN | 203654366 U | 6/2014 |
|---|---|---|
| CN | 204196660 U | 3/2015 |

(Continued)

OTHER PUBLICATIONS

Harayama et al., "Window Body", Aug. 10, 2006, Japanese Patent Office, Edition: JP2006205926A (Year: 2006).*

(Continued)

*Primary Examiner* — Dennis H Pedder
*Assistant Examiner* — Joyce Eileen Hill

(57) ABSTRACT

A cab capable of shielding solar radiation comprises a pair of front pillars and a pair of vertical beams; a front window glass member mounted movably along guide rails formed along the front pillars and the vertical beams, between a closing position for closing a front window formed between the front pillars and an opening position for opening the front window accommodated between the vertical beams; a roll screen and a winding member, wherein the winding member is disposed behind the inner surface of the front window glass member positioned at the closing position and in front of the front end of the front window glass member positioned at the opening position and on the outer side of the pair of guide rails; and a holding means attached to the front pillars and configured to releasably hold the leading end of the screen.

3 Claims, 4 Drawing Sheets

(51) Int. Cl.
　　　*B60J 1/00*　　　　(2006.01)
　　　*B60J 1/20*　　　　(2006.01)

(58) Field of Classification Search
　　　USPC .................. 296/96.21, 190.1, 214, 216.04
　　　See application file for complete search history.

(56) References Cited

FOREIGN PATENT DOCUMENTS

| CN | 103628801 B | | 5/2015 | | |
|---|---|---|---|---|---|
| CN | 104120949 B | | 11/2017 | | |
| CN | 106436809 B | | 9/2018 | | |
| JP | H04133911 U | * | 12/1992 | ................ | B60J 1/00 |
| JP | H06-50920 U | | 7/1994 | | |
| JP | 2003096826 A | | 4/2003 | | |
| JP | 2004155356 A | | 6/2004 | | |
| JP | 2006205926 A | * | 8/2006 | ................ | B60J 1/00 |
| JP | 3825274 B2 | | 9/2006 | | |
| JP | 2016094780 A | | 5/2016 | | |

OTHER PUBLICATIONS

Toshihiko Inamata, "Capin's Windshield Storage Structure", Dec. 11, 1992 (Year: 1992).*
International Search Report for related International Application No. PCT/EP2018/062812 report dated Aug. 7, 2018.

\* cited by examiner

CAB FOR CONSTRUCTION MACHINE

CROSS-REFERENCE TO RELATED APPLICATION

This Application is a 35 USC § 371 US National Stage filing of International Application No. PCT/EP2018/062812 filed on May 16, 2018 which claims priority under the Paris Convention to Japanese Patent Application No, 2017-098350 filed on May 17, 2017.

TECHNICAL FIELD

The present invention relates to a cab for construction machine capable of shielding at least a part of the solar radiation entering from a front window.

BACKGROUND ART

The Patent Literature 1 listed below discloses a sunshade device for construction machine capable of shielding at least a part of the solar radiation entering from a skylight of a cab at any time of closing or opening a front window of the cab. This sunshade device of the construction machine comprises a sunshade, a bracket to which the base end portion instead of a pull-out side end portion of the sunshade is fixed, provided on the upper end side of the front window when closing the front window for accommodating the sunshade, a fixture at the pull-out side end portion of the sunshade, and configured to fix the sunshade pulled out, a first fixture receiver provided nearby the rear end portion of a skylight in an operation room, and configured to receive the fixture of the sunshade pulled out when closing the front window, a second fixture receiver provided on front window on the lower end side of the bracket when closing the front window, and configured to receive the fixture of the sunshade at a position where the sunshade pulled out when opening the front window covers at least a part of the skylight. Then, with the sunshade device of the construction machine, the fixture of the sunshade is fixed to the first fixture receiver when closing the front window, and also the fixture of the sunshade is fixed to the second fixture receiver when opening the front window, so that at least a part of the solar radiation entering from the skylight can be shielded by the sunshade at any time of closing or opening the front window.

CITATION LIST

Patent Literature

[Patent Literature 1] JP 2016-94780 A

SUMMARY OF INVENTION

Technical Invention

When performing work using a construction machine, an operator might feel dazzling due to the solar radiation entering from the front window depending on the period or season, which might hinder the work. However, in the sunshade device of the construction machine disclosed in the Patent Literature 1, at least a part of the solar radiation entering from the skylight at any time of closing or opening the front window can be shielded by the sunshade, whereas the solar radiation entering from the front window cannot be at all shielded when opening the front window at least. Therefore, in the sunshade device of the construction machine disclosed in the Patent Literature 1, even when it is desired to shield at least a part of the solar radiation entering from the front window while opening the front window for the purpose of ventilation or the like, both the opening of the front window and shielding at least a part of the solar radiation entering from the front window never be satisfied at the same time.

A problem of the present invention made in view of the above fact is to provide a cab for construction machine capable of shielding at least a part of the solar radiation entering from the front window at any time of closing or opening the front window.

Solution to Problem

To solve the above problem, the present invention provides a cab for construction machine as follow. That is, the cab for construction machine comprises a pair of front pillars arranged spaced apart from one another in the width direction; a pair of vertical beams extending backward from respective upper ends of the pair of front pillars; a front window glass member mounted movably along a pair of guide rails formed along the pair of front pillars and the pair of vertical beams, between a closing position for closing a front window formed between the pair of front pillars and an opening position for opening the front window accommodated between the pair of vertical beams; a roll screen having a screen and a winding member for winding the screen, wherein the winding member is disposed behind the inner surface of the front window glass member positioned at the closing position and in front of the front end of the front window glass member positioned at the opening position and on the outer side of the pair of guide rails; and a holding means attached to the pair of front pillars and configured to releasably hold the leading end of the screen.

Preferably, a skylight is formed between the pair of vertical beams, and an additional holding means for releasably holding the leading end of the screen is added to the pair of vertical beams. It is suitable that a horizontal beam is bridged between the upper ends of the pair of front pillars, and the winding member of the roll screen is disposed within a dead angle region of an operator formed by the horizontal beam.

Advantageous Effects of Invention

In the cab for construction machine provided by the present invention, since the winding member of the roll screen is arranged behind the inner surface of the front window glass member positioned at the closing position, in front of the front end of the front window glass member positioned at the opening position, and on the outer side of the pair of guide rails, the leading end portion of the screen can be held in the holding means without hindering the pull-out of the screen, even when the front window glass member is positioned at any position of the closing position or the opening position. Therefore, with the cab for construction machine of the present invention, at least a part of the solar radiation entering from the front window is shielded by the screen at any time of closing or opening the front window.

DESCRIPTION OF EMBODIMENTS

Hereinafter, an embodiment of a cab for construction machine configured in accordance with the present invention will be described with reference to the drawings.

Figure 1:
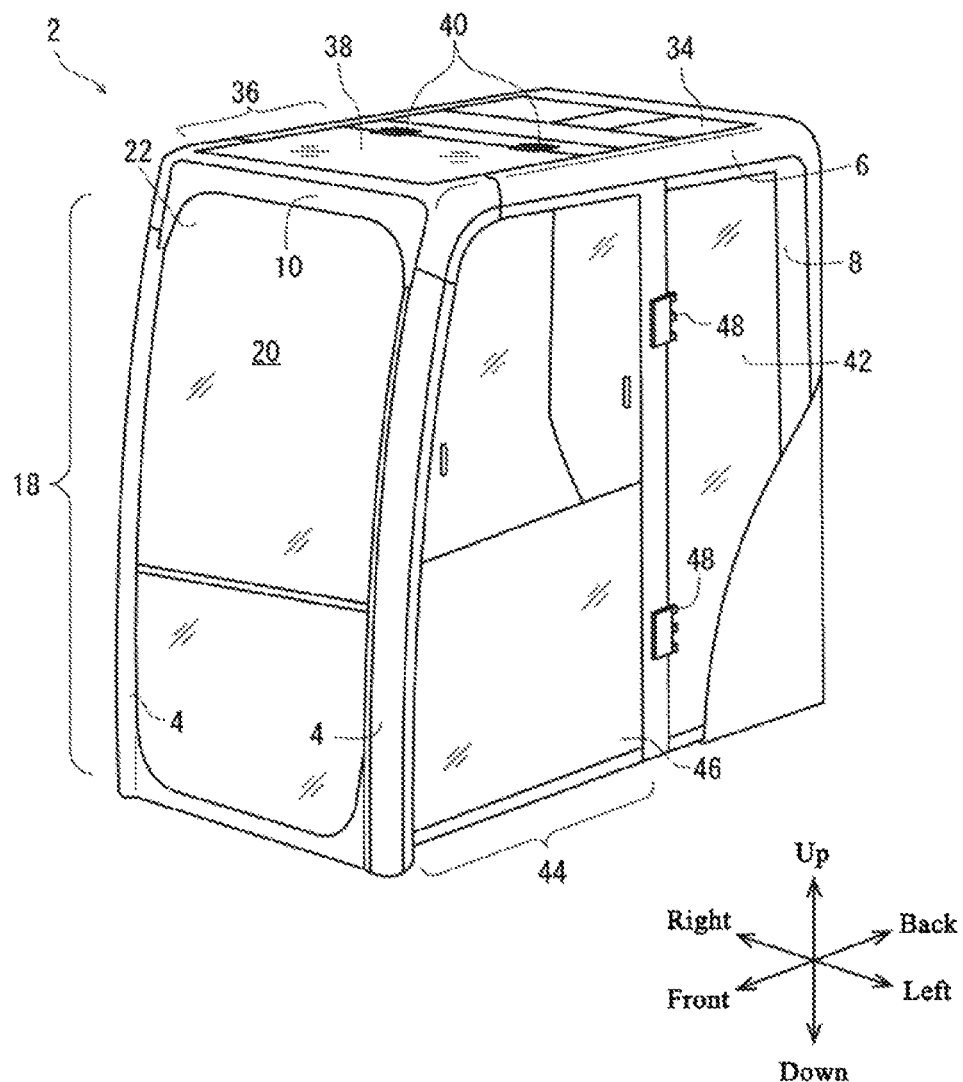
FIG. 1 is a perspective view of a cab for construction machine configured in accordance with the present invention.

A cab 2 provided in a construction machine such as a hydraulic excavator, as shown in FIG. 1, is formed in a rectangular parallelepiped shape as a whole by attaching a window glass member, a panel, a door, and the like to a frame formed of an appropriate metal material such as a steel pipe. The frame of the cab 2 includes a pair of front pillars 4 which are arranged spaced apart from one another in the width direction and extend in the up and down direction, a pair of vertical beams 6 extending backward from the upper ends of the respective front pillars 4, a pair of rear pillars 8 extending downward from the rear ends of the respective vertical beams 6, and a horizontal beam 10 extending between the upper ends of the front pillars 4 and extending in the width direction. The front and back direction, the up and down direction and the left and right direction in the present specification are the front and back direction, the up and down direction and the left and right direction indicated by the respective characters and arrows of front, back, up, down, left and right.

Figure 2:
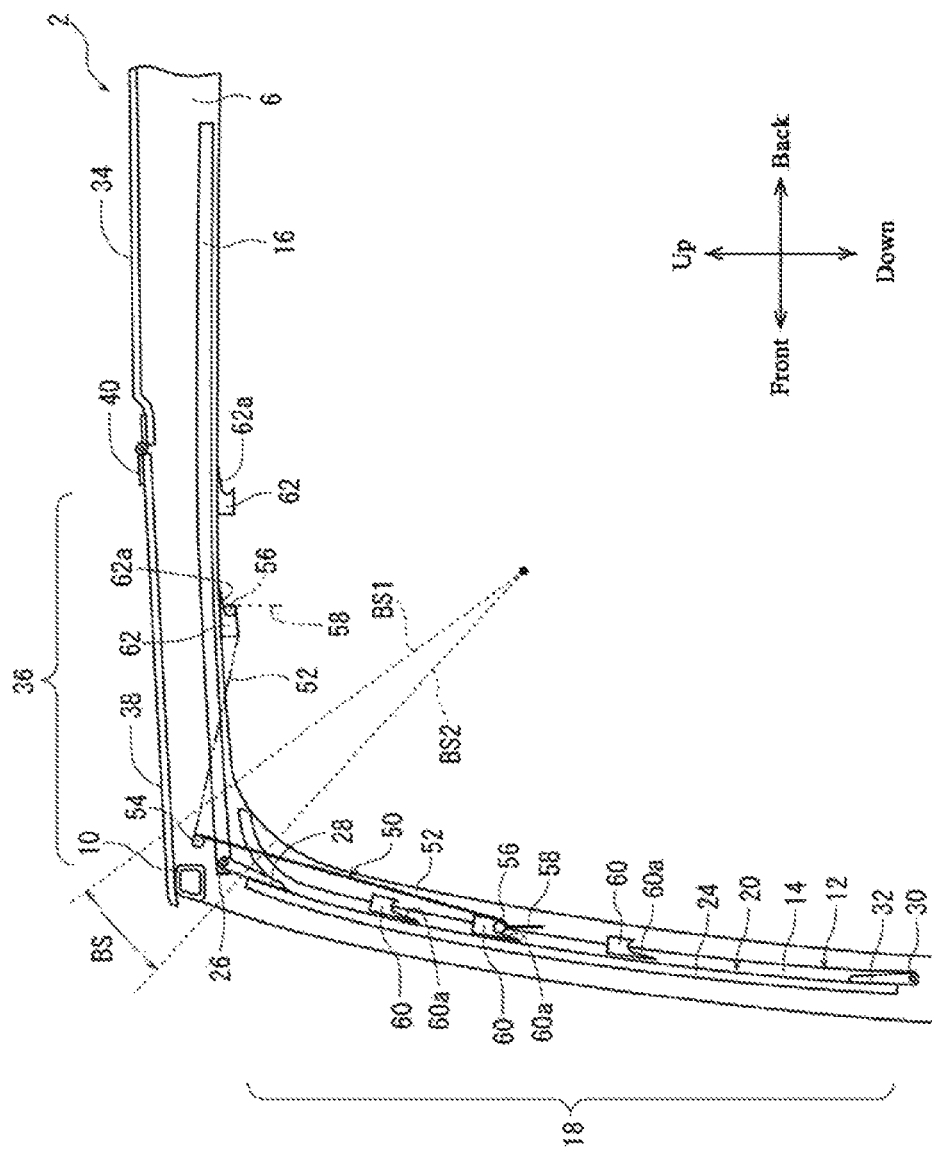
FIG. 2 is a cross-sectional view of a cab in a state where the front window glass member is positioned at the closing position.

As shown in FIG. 2, a guide rail 12 extending along the front pillar 4 and the vertical beam 6 is formed in each of the front pillars 4 and each of the vertical beams 6. Each guide rail 12 has a first portion 14 extending in the up and down direction along the front pillar 4 and a second portion 16 extending in the front and back direction along the vertical beam 6. In the illustrated embodiment, the upper end side of the first portion 14 is bent to extend in the front and back direction, but the upper end of the first portion 14 and the front end of the second portion 16 are not connected, and the first portion 14 and the second portion 16 are discontinuous. In the guide rail 12, the upper end of the first portion 14 and the front end of the second portion 16 may be connected, and the first portion 14 and the second portion 16 may be continuous.

As shown in FIG. 1, a rectangular front window 18 (opening) is formed between the front pillars 4, and a front window glass member 20 is mounted movably along the pair of guide rails 12 between a closing position (see FIGS. 1 and 2) for closing the front window 18 and an opening position (see FIG. 3) where to open the front window 18 accommodated between the vertical beams 6. The front window glass member 20 includes a rectangular glass plate 22 (see FIG. 1) and a square type annular frame body 24 (see FIGS. 2 and 3) mounted on the periphery of the glass plate 22. As shown in FIG. 2, an upper roller 26 is rotatably mounted via an upper bracket 28 on the upper end portion of the frame body 24 in the closing position, and a lower roller 30 is rotatably mounted via a lower bracket 32 on the lower end portion of the frame body 24 in the closing position. The upper rollers 26, the upper brackets 28, the lower rollers 30, and the lower brackets 32 are provided at both end portions in the width direction of the respective frame bodies 24. The upper roller 26 is guided to the second portion 16 of the guide rail 12 and the lower roller 30 is guided to the first portion 14 of the guide rail 12, whereby the front window glass member 20 is movable freely between the closing position and the opening position.

In the illustrated embodiment, as shown in FIG. 1, a rectangular top panel 34, which can be mainly formed of steel plate, is fixed to the rear part between the vertical beams 6, and a rectangular skylight 36 (opening) is formed on the front part between the vertical beams 6. On the front end of the upper panel 34, a rectangular skylight glass member 38, which openably closes the skylight 36, is turnably mounted via a hinge 40. A rectangular side panel 42 that can be formed of a glass plate and a steel plate and the like is fixed to the rear part between the front pillar 4 on the left side and the rear pillar 8 on the left side. At the front part between the front pillar 4 on the left side and the rear pillar 8 on the left side, there is formed a rectangular doorway 44 for an operator to get in and off the cab 2. At the front end of the side panel 42, a rectangular door 46 openably closing the doorway 44, is mounted turnably via a hinge 48.

As shown in FIG. 2, inside the cab 2, there is provided a roll screen 50 for shielding at least a part of the solar radiation entering the cab 2. The roll screen 50 includes a light-shielding band-shaped screen 52 that can be formed of an appropriate resin material such as nylon, PVC, ABS, and the like, and a winding member 54 for winding the screen 52. The screen 52 is formed in a width direction dimension substantially equal to the width direction dimension of the glass plate 22 of the front window glass member 20. In the illustrated embodiment, a cylindrical held rod 56 extending in the width direction of the cab 2 is attached to the leading end (pull-out side end) of the screen 52 and further a rectangular grip band 58 extending downward is added to the held rod 56. A plurality of grip bands 58 may be added spaced apart from one another in the width direction. The both end portions in the axial direction of the cylindrical winding member 54 extending in the width direction of the cab 2 are rotatably attached to the respective vertical beams 6 or interior material (not shown) such as resin or the like of the respective vertical beams 6. A power spring (not shown) is built in the winding member 54, and the base end portion of the screen 52 is connected to the power spring. Then, the screen 52 is urged in the winding direction by the power spring. As will be understood by referring to FIGS. 2 and 3, the winding member 54 is located behind the inner surface of the front glass member 20 positioned in the closing position, and in front of the front end of the front glass member 20 positioned in the opening position, and on the outer side of the guide rail 12. As shown in FIG. 2, it is preferable that the winding member 54 is disposed within an operator's dead angle region BS (the region defined by the dotted line BS 1 and the dotted line BS2 in FIG. 2) of the formed by the horizontal beam 10, so that the deterioration of the visibility of the operator due to the fact that the roll screen 50 is provided inside the cab 2 is suppressed Continuing the explanation with reference to FIG. 2, a holding means for releasably holding the leading end portion of the screen 52 is attached to each of the front pillars 4. The holding means in the illustrated embodiment is composed of a plurality of holding pieces 60 fixed to each of the front pillars 4 spaced apart in the up and down direction. Each holding piece 60 is positioned on the inside in the widthwise direction with respect to the first portion 14 of the guide rail 12, and each holding piece 60 is provided with a semicircular recessed portion 60a for holding the held rod 56 of the roll screen 50. In addition, it is advantageous that each of the vertical beams 6 is additionally provided with additional holding means for releasably holding the leading end portion of the screen 52. The additional holding means in the illustrated embodiment is constituted of a plurality of additional holding pieces 62 fixed to the respective vertical beams 6 spaced apart in the front-back direction. Each additional holding piece 62 is located below the second portion of the guide rail 12 and a semicircular recessed portion 62a for holding the held rod 56 of the roll screen 50 is formed in each additional holding piece 62.

When shielding the solar radiation entering from the front window 18, the operator grasps the grip band 58 and pulls out the screen 52 downward, and then the held rod 56 can be hung on the recessed portion 60 of the holding piece 60 to hold the screen 52. In the illustrated embodiment, since the winding member 54 is arranged behind the inner surface of the front window glass member 20 positioned in the closing position, and in front of the front end of the front window glass member 20 positioned in the opening, and on the outer side of the guide rail 12, even when the front window glass member 20 is positioned at any position of the closing position or the opening position, the pulling downward of the screen 52 is not hindered, and the held rod 56 can be held by the holding piece 62. Therefore, in the illustrated embodiment, since at least a part of the solar radiation entering from the front window 18 is shielded by the screen 52 at any time of closing or opening the front window 18, an operator does not feel dazzling due to the solar radiation entering from the front window 18 when performing a work using a construction machine, and there is no concern that the work might be hindered. In addition, in the illustrated embodiment, since even when the front window glass member 20 is positioned at the opening position, the screen 52 is not hindered from being pulled downward and the held rod 56 can be held by the holding piece 60, at least a part of the solar radiation entering from the front window 18 can be shielded while opening the front window 18 for the purpose of ventilation. In the illustrated embodiment, since the plurality of holding pieces 60 are fixed to the respective front pillars 4 spaced apart from one another in the up and down direction, the holding piece 60 for holding the screen 52 is appropriately selected, so that the shielding amount by the screen 52 of the solar radiation entering from the front window 18 can be adjusted.

In the illustrated embodiment, since a rectangular skylight 36 is formed in the front part between the vertical beams 6, and a plurality of additional holding pieces 62 for holding the held rod 56 of the roll screen 50 are added to each of the vertical beams 6, at least a part of the solar radiation entering from the skylight 36 can be shielded by the screen 52. More specifically, when shielding the solar radiation entering from the skylight 36, the operator grips the grip band 58 and pulls out the screen 52 backward, and subsequently holds the screen 52 by hanging the held rod 56 on the recessed portion 62a of the additional holding piece 62. In the illustrated embodiment, since the winding member 54 is arranged behind the inner surface of the front glass member 20 positioned in the closing position, and in front of the front end of the front glass member 20 positioned in the opening position, and on the outer side of the guide rail 12, the screen 52 is never hindered from being pulled out backward, even when the front window glass member 20 is positioned at any position of the closing position or the open position, and the held rod 56 can be held by the additional holding piece 62. Therefore, in the illustrated embodiment, since at least a part of the solar radiation entering from the skylight 36 is shielded by the screen 52 at any time of closing or opening the front window 18, even when a cover plate (although not shown, for example, a cover plate slidably mounted between the vertical beams 6) for covering the skylight glass member 38 is not provided, the operator does not feel dazzling by the solar radiation entering from the skylight 36 when the work is carried out by using a construction machine and there is no fear of interfering with the work. Further, in the illustrated embodiment, even when the front window glass member 20 is positioned at the opening position, the screen 52 is never hindered from being pulled backward and the held rod 56 can be held by the additional holding piece 62. Consequently, at least a part of the solar radiation entering from the skylight 36 can be shielded while opening the front window 18 for ventilation or the like. In the illustrated embodiment, since the plurality of additional holding pieces 62 are fixed to the respective vertical beams 6 spaced apart from one another in the front and back direction, the amount of shielding by the screen 52 of the solar radiation entering from the skylight 36 is adjusted by appropriately selecting the additional holding piece 62 for holding the screen 52. When the screen 52 is stored in the winding member 54, the held rod 56 is separated from the recessed portion 60a of the holding piece 60 or the recessed portion 62a of the additional holding piece 62. As a result, the screen 52 is wound around and stored in the winding member 54 by the urging force of the power spring.

Figure 3:
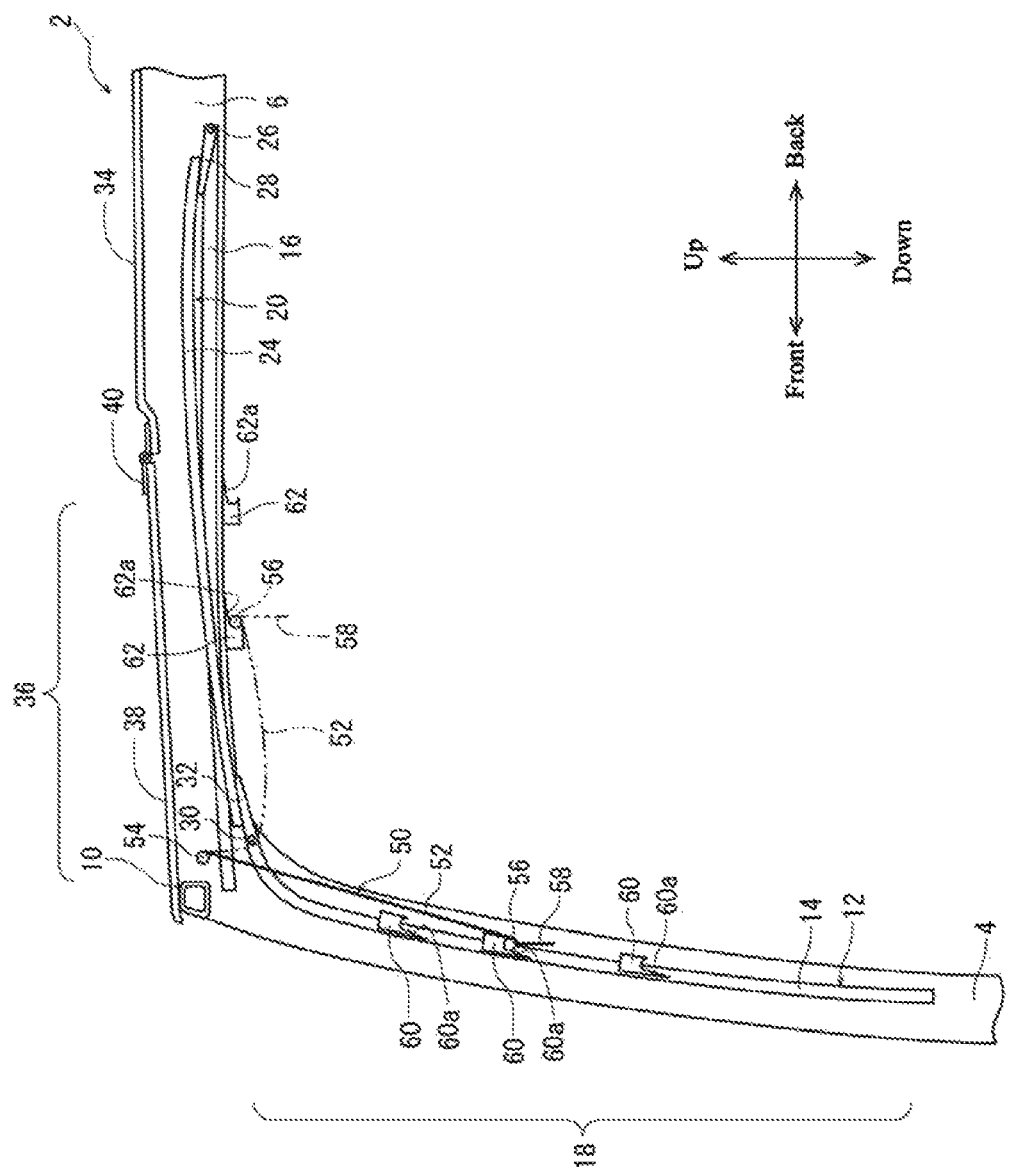
FIG. 3 is a cross-sectional view of a cab in a state where the front window glass member is positioned at the opening position.
Figure 4:
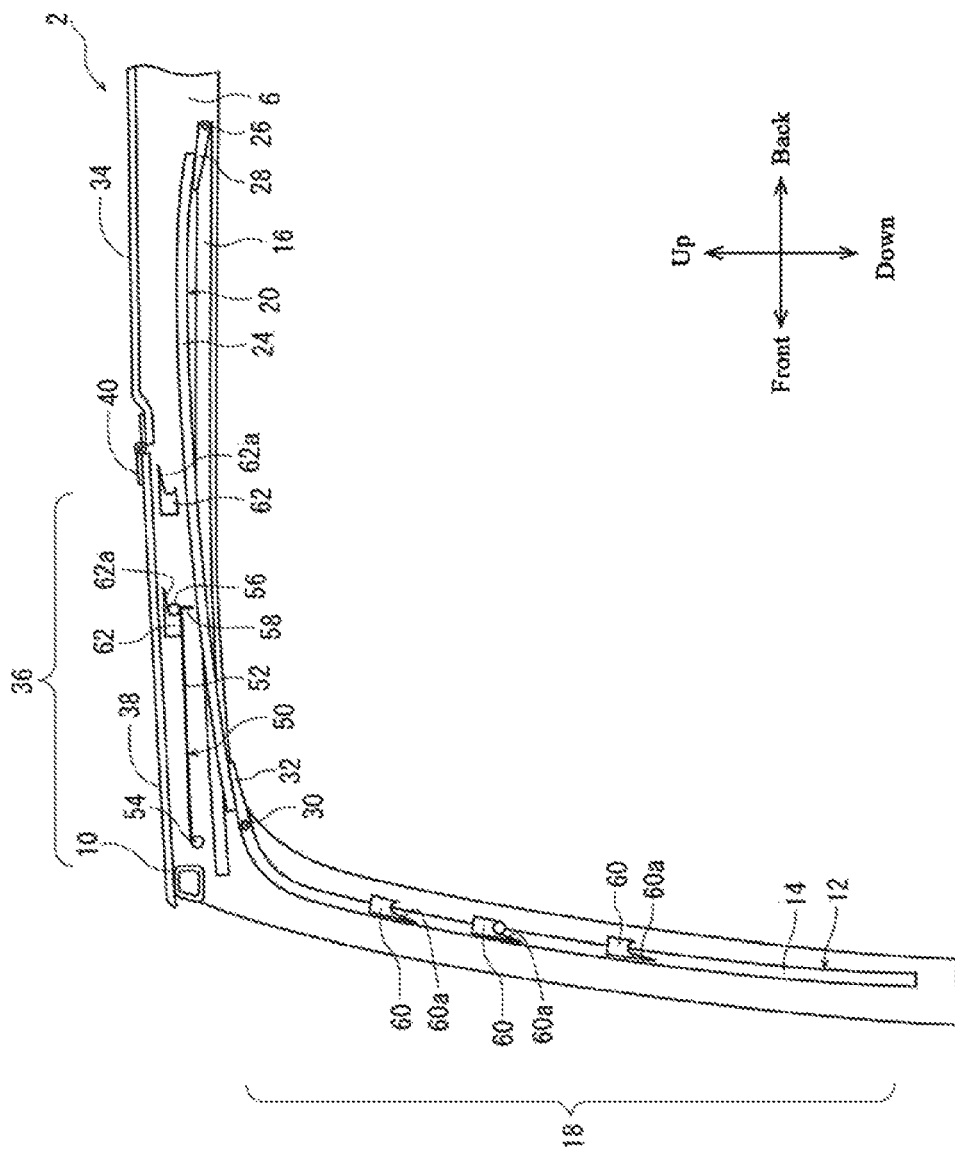
FIG. 4 is a cross-sectional view of a cab in a state where the front window glass member is positioned at the opening position below the screen pulled out backward.

Regarding the holding means and the additional holding means, in the illustrated embodiment, there has been described an example of being constituted of the holding piece 60 and the additional holding piece 62 having the recessed portions 60a. 62a for hanging the held rod 56 of the roll screen 50 being formed therein respectively. However, in a case where a hook (not shown) is added to the leading end of the screen 52, the holding means may be constituted of a notch or a hole through which the hook is hooked. As shown in FIG. 3 in the illustrated embodiment, to prevent the backward pull-out of the screen 52 from being disturbed even when the front window glass member 20 is positioned at the opening position, there has been described an example of the screen 52 that is pulled out below the front window glass member 20 positioned in the opening position. However, as shown in FIG. 4, the additional holding piece 62 is disposed above the second portion of the guide rail 12, and after the screen 52 has been pulled out backward, the front window glass member 20 is positioned at the opening position, thereby the front window glass member 20 may be positioned below the screen 52 pulled out backward.

REFERENCE SIGNS LIST

2: cab
4: front pillar
6: vertical beam
10: horizontal beam
12: guide rail
18: front window
20: front window glass member
36: skylight
52: screen
54: winding member
60: holding piece (holding means)
60a: recessed portion (holding means)
62: additional holding piece (additional holding means)
62a: recessed portion (additional holding means)

The invention claimed is:

1. A cab for construction machine comprising:

A pair of front pillars arranged spaced apart from one another in the width direction;

a pair of vertical beams extending backward from respective upper ends of the pair of front pillars;

a front window glass member mounted movably along a pair of guide rails formed along the pair of front pillars and the pair of vertical beams, between a closing position for closing a front window formed between the pair of front pillars and an opening position for opening the front window accommodated between the pair of vertical beams;

a roll screen having a screen and a winding member for winding the screen, wherein the winding member is disposed behind the inner surface of the front window glass member positioned at the closing position and in front of the front end of the front window glass member positioned at the opening position and on the outer side of the pair of guide rails; and a holding means attached to the pair of front pillars and configured to releasably hold the leading end of the screen.

2. The cab for construction machine according to claim 1, wherein a skylight is formed between the pair of vertical beams, and an additional holding means for releasably holding the leading end of the screen is added to the pair of vertical beams.

3. The cab for construction machine according to claim 1, wherein a horizontal beam is bridged between the upper ends of the pair of front pillars, and the winding member of the roll screen is disposed within a dead angle region of an operator formed by the horizontal beam.

* * * * *